Sept. 18, 1934.   J. DELLINGER   1,974,355
HYDROFERTILIZER APPARATUS
Filed Jan. 5, 1933
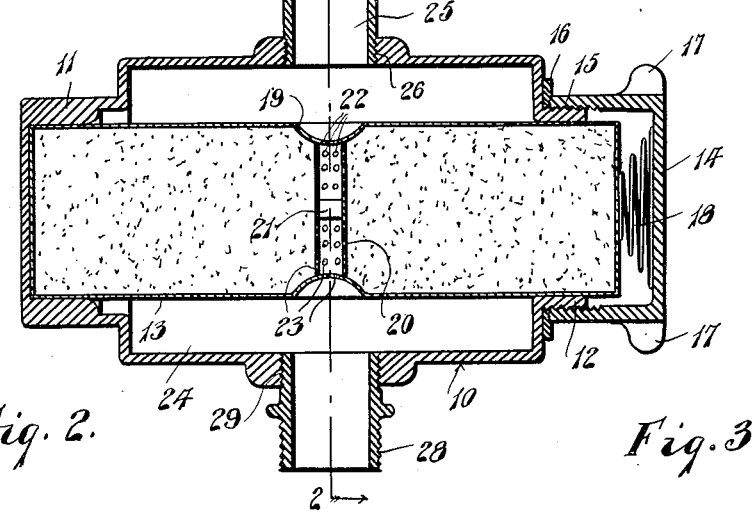
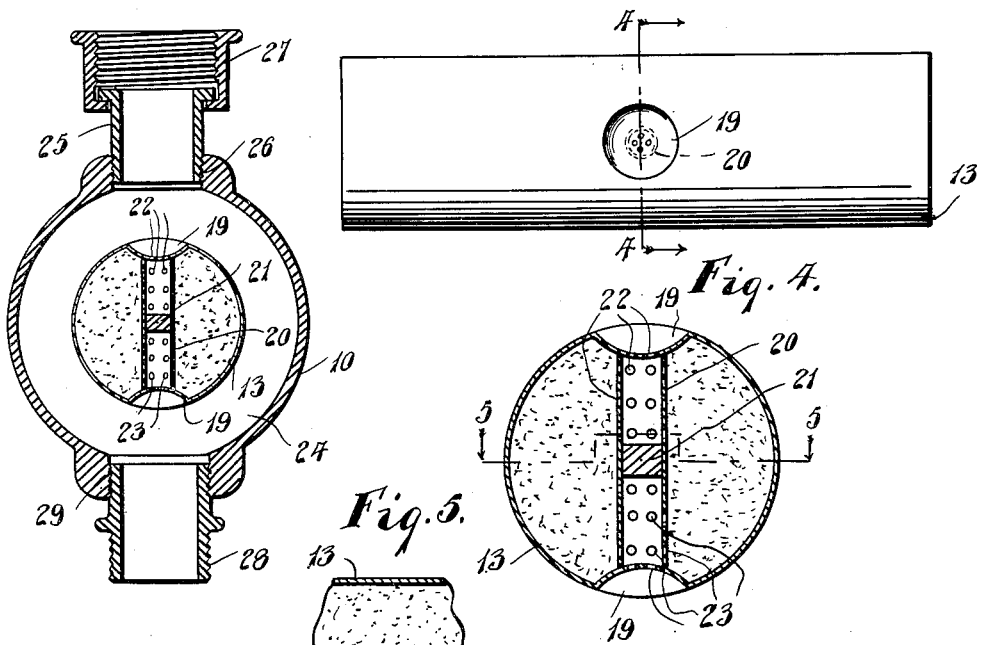
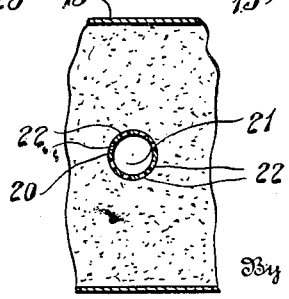
Inventor
John Dellinger.
By L. F. Randolph Jr.
Attorney Patented Sept. 18, 1934

1,974,355

UNITED STATES PATENT OFFICE 1,974,355

HYDROFERTILIZER APPARATUS

John Dellinger, Buffalo, N. Y.

Application January 5, 1933, Serial No. 650,359

4 Claims. (Cl. 299—83)

This invention relates to an apparatus whereby fertilizer may be distributed through the action or passage of water through an ordinary garden hose, piping or the like, in order to enrich the garden, lawn, flowers and the like.

It is also aimed to provide the device in the form of an attachment so that it may be readily removed when the hose is to be used in the usual manner.

The invention is capable of use in distributing insecticide, fungicides and the like, as well as fertilizer.

A particular object is to provide a construction wherein a renewable cartridge containing the fertilizer or the like, is used, which cartridge has a perforated portion in the line of flow of the water facilitating a vacuum or suction action and better distribution.

The more specific objects and advantages will become apparent from a consideration of the description following taken in connection with accompanying drawing illustrating an operative embodiment.

In said drawing:—

Figure 1 is a view in central longitudinal section through the improved distributor, Figure 2 is a sectional view taken on the line 2—2 of Figure 1, Figure 3 is a plan view of the cartridge alone, Figure 4 is a transverse sectional view through the cartridge taken on the line 4—4 of Figure 3, and Figure 5 is a fragmentary longitudinal sectional view through the cartridge taken on the line 5—5 of Figure 4.

Referring specifically to the drawing, the device comprises a casing 10 usually made of a suitable metal. The casing is generally cylindrical but at one end is reduced, having a closed portion 11 and at the other end having a reduced open portion or neck 12. Removably disposed in the portions 11 and 12 is a cartridge 13, generally cylindrical and for instance of thin metal such as tin. Such cartridge is held in place by means of a cap 14 screw-threaded as at 15 to the neck 12, a gasket 16 being interposed to provide a water-tight joint. The closure or cap 14 preferably has manipulating lugs as at 17 and within the same an expansive spring 18 engages the cap and the cartridge to hold the latter in place and particularly against turning relatively to the casing.

At diametrically opposite points 19 cartridge 13 is depressed and connected by a radial tube 20. Midway of the ends of the tube 20 it is filled or plugged as at 21 so that water cannot pass therethrough. The tube, however, on opposite sides of the plug 21 is perforated as at 22 and 23, so that water may flow in through the perforations 22 and out through the perforations 23. The cartridge is adapted to contain a suitable fertilizer, insecticide, fungicide, or the like which will be dissolved by the water as it flows through the device. The construction described provides an enlarged chamber 24 about the cartridge and a nipple 25 is threaded at 26 to the casing. An internally screw-threaded fitting 27 is swiveled on the nipple 25 and adapted for connection to a faucet or supply of water. At a diametrically opposite point to the nipple 25, a nipple 28 is screw-threaded at 29 to the casing 10 and is adapted to have a garden hose or the like attached thereto.

The cartridge is fastened in place with the tube 20 alined with the nipples 25 and 28. The water from the source of supply will flow through the nipple 25 into the chamber 24 and tube 20, entering the cartridge through the ports 22, dissolving material within the cartridge and leaving through the ports 23 and then admixing with the other water within the casing opposite the nipple 28, then flowing through the nipple 28 and hose to the garden, plants, lawn or the like. Attention is called to the fact that the construction described creates a suction through the ports 23.

It will be realized that the cartridge may be readily renewed when the supply of the fertilizer, insecticide or fungicide is exhausted, and that the cartridge may be sold as such independently of the other part of the device.

In addition, it will be noted that the device may be readily disconnected at 27 from the faucet or the like when merely water is to be distributed and in the usual way, or if desired, the cartridge only may be removed under such conditions.

Various changes may be resorted to provided they fall within the spirit and scope of the invention.

I claim as my invention:—

1. A device of the class described having a casing, said casing having means to mount therein a cartridge containing soluble material, a cartridge mounted by said means, said means having a lateral opening for the removal of said cartridge, a closure for said opening engaging a portion of the mounting means providing the opening, said casing having an enlarged chamber portion about the cartridge, an opposed inlet and outlet for fluid to and from said chamber portion, said cartridge having a tube extending completely therethrough and communicating at opposite ends with said chamber portion whereby a suction will be created through the tube by the passage of fluid through the chamber portion, said tube being perforated so that the fluid may communicate with the contents of the cartridge.

2. A device of the class described having a casing, said casing having means to mount therein a cartridge containing soluble material, a cartridge mounted by said means, said means having a lateral opening for the removal of said cartridge, a closure for said opening engaging a portion of the mounting means providing the opening, said casing having an enlarged chamber portion about the cartridge, an opposed inlet and outlet for fluid to and from said chamber portion, said cartridge having a tube extending completely therethrough and communicating at opposite ends with said chamber portion whereby a suction will be created through the tube by the passage of fluid through the chamber portion, said tube being perforated so that the fluid may communicate with the contents of the cartridge, and a plug within the tube intermediate its ends to cause the fluid to pass out of the tube into the cartridge and thence back into the tube during use of the device.

3. A device of the class described having a casing, said casing having means to mount therein a cartridge containing soluble material, a cartridge mounted by said means, said casing having an enlarged chamber portion about the cartridge, an opposed inlet and outlet for fluid to and from said chamber portion, said cartridge having a tube extending completely therethrough and communicating at opposite ends with said chamber portion whereby a suction will be created through the tube by the passage of fluid through the chamber portion, said tube being perforated so that the fluid may communicate with the contents of the cartridge, said means being so constructed as to permit angular adjustment of said cartridge about an axis not alined with said inlet or said tube, rotation of the cartridge serving to vary the position of said tube to regulate the passage of water through the tube.

4. A device of the class described having a casing, said casing at one end having a closed cylindrical portion, and at its other end having an open neck, a cartridge in said casing insertable through the neck and mounted by said portion and said neck, said casing having an enlarged chamber portion about the cartridge intermediate the first mentioned portion and said neck, a closure detachably connected to the neck, an opposed inlet and outlet for fluid to and from said chamber portion, said cartridge having a tube extending completely therethrough and communicating at opposite ends with said chamber portion whereby a suction will be created through the tube by the passage of fluid through the enlarged chamber portion, said tube being perforated so that the fluid may communicate with the contents of the cartridge.

JOHN DELLINGER.